United States Patent [19]
Wise et al.

[11] Patent Number: 5,513,975
[45] Date of Patent: May 7, 1996

[54] PIPE EXTRUSION DIE HEAD MANIFOLD ASSEMBLY

[75] Inventors: John Wise; Larry L. Martin, both of Hamilton, Ohio

[73] Assignee: Advanced Drainage Systems, Inc., Columbus, Ohio

[21] Appl. No.: 224,559

[22] Filed: Apr. 7, 1994

[51] Int. Cl.$^6$ ................................................ B29C 47/92
[52] U.S. Cl. ........................................ 425/393; 264/209.4
[58] Field of Search .......................... 425/393, 403, 425/378.1, 72.1; 264/560, 563, 209.4, 568, 177.17, 209.8, DIG. 41, 285, 286, 168

[56] References Cited

U.S. PATENT DOCUMENTS

| | | | |
|---|---|---|---|
| 3,169,272 | 2/1965 | Maxson | 425/377 |
| 3,425,092 | 2/1969 | Jun Taga | 425/192 R |
| 3,660,000 | 5/1972 | Yoshida et al. | 425/327 |
| 3,907,961 | 9/1975 | Carrow | 264/314 |
| 4,377,545 | 3/1983 | Hornbeck | 264/167 |
| 4,663,107 | 5/1987 | Takada et al. | 264/519 |
| 4,770,618 | 9/1988 | Lupke | 425/72.1 |
| 4,808,098 | 2/1989 | Chan et al. | 425/72.1 |
| 5,261,988 | 11/1993 | Dikis et al. | 264/560 |
| 5,296,188 | 3/1994 | Lupke | 264/508 |
| 5,320,797 | 6/1994 | Hegler et al. | 264/511 |

*Primary Examiner*—Richard L. Chiesa
*Attorney, Agent, or Firm*—Biebel & French

[57] ABSTRACT

An improved manifold assembly which can be used in conjunction with a die head in the extrusion of a plastic with the manifold assembly having a water inlet tube, a tube through which a vacuum is pulled, a water return tube, a calibration finger first section, and a calibration finger second section.

17 Claims, 7 Drawing Sheets

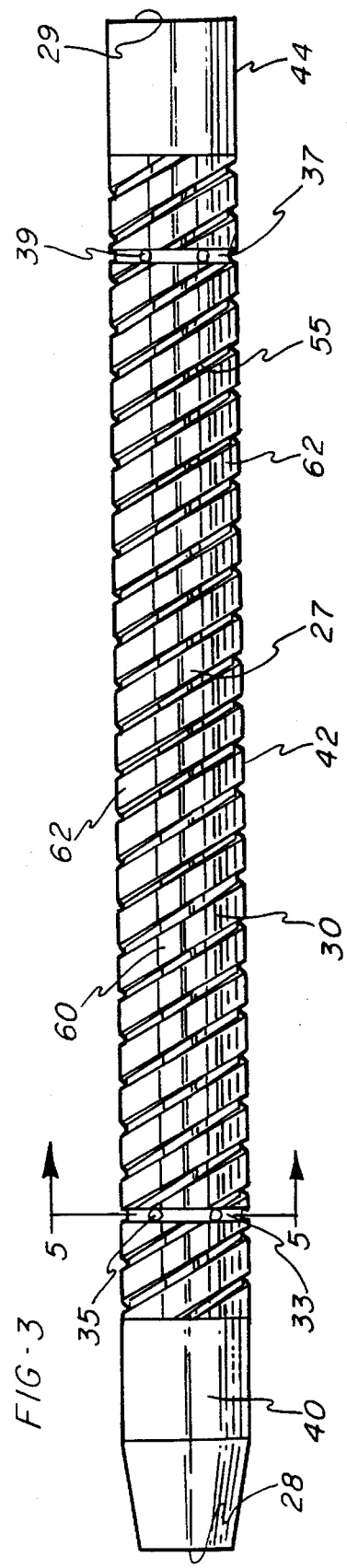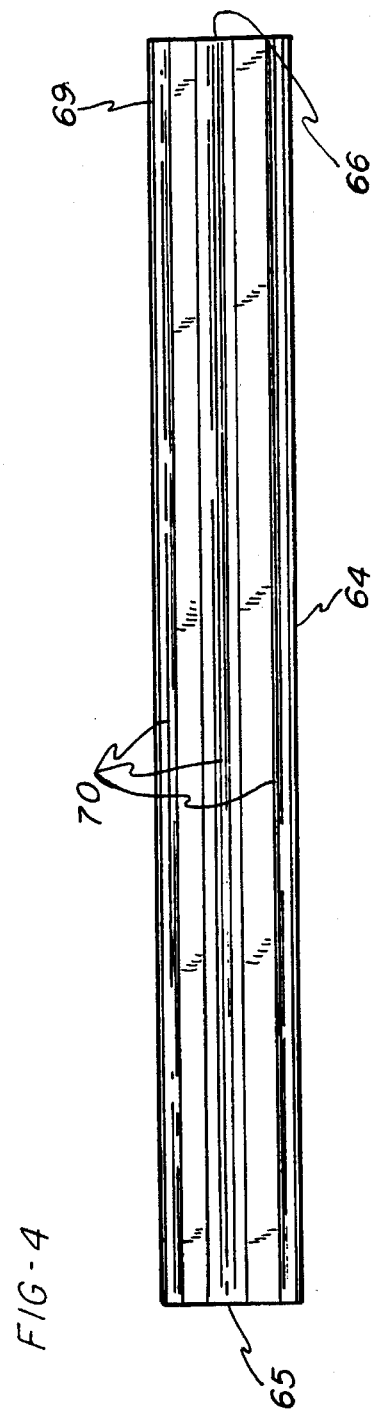

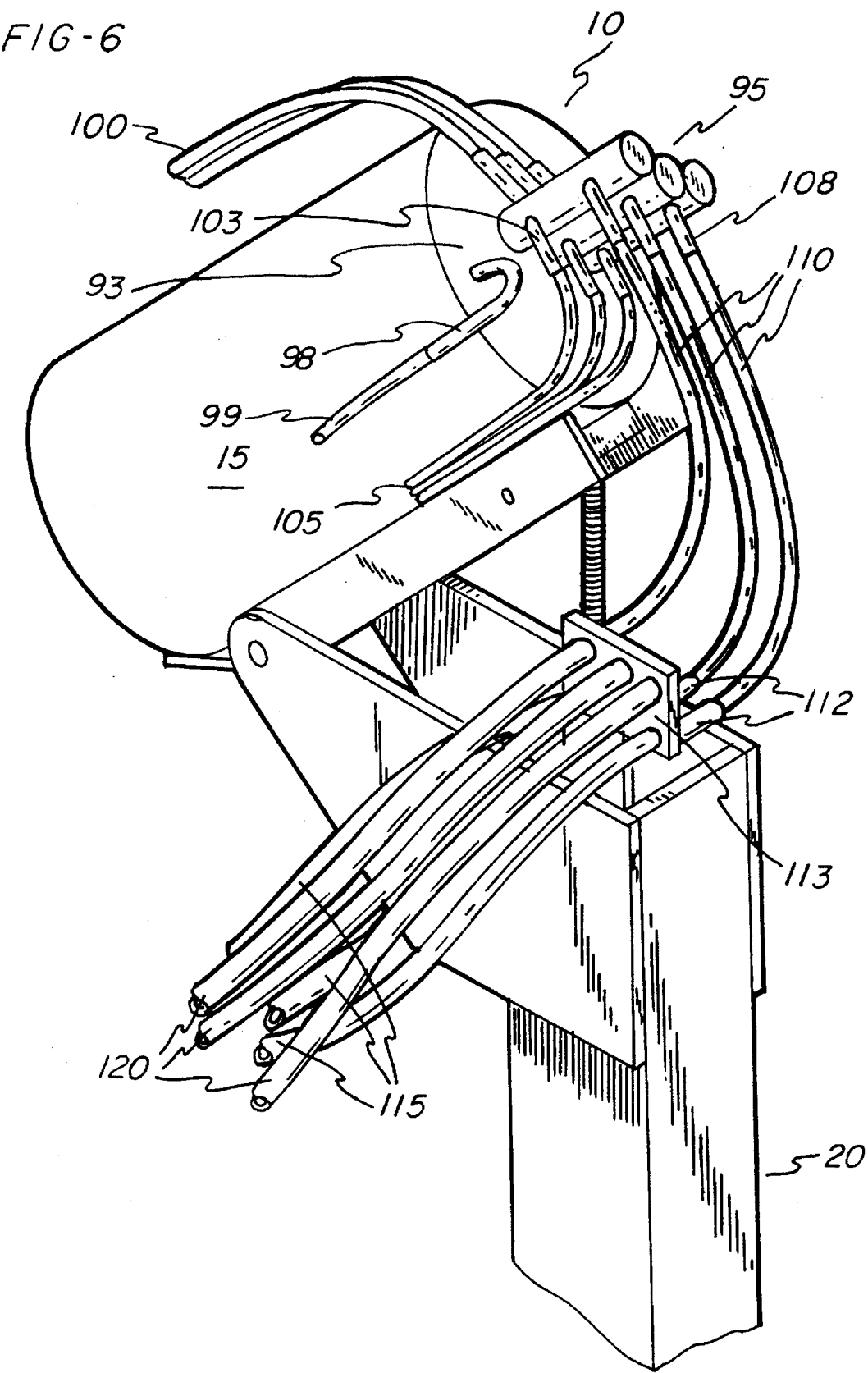

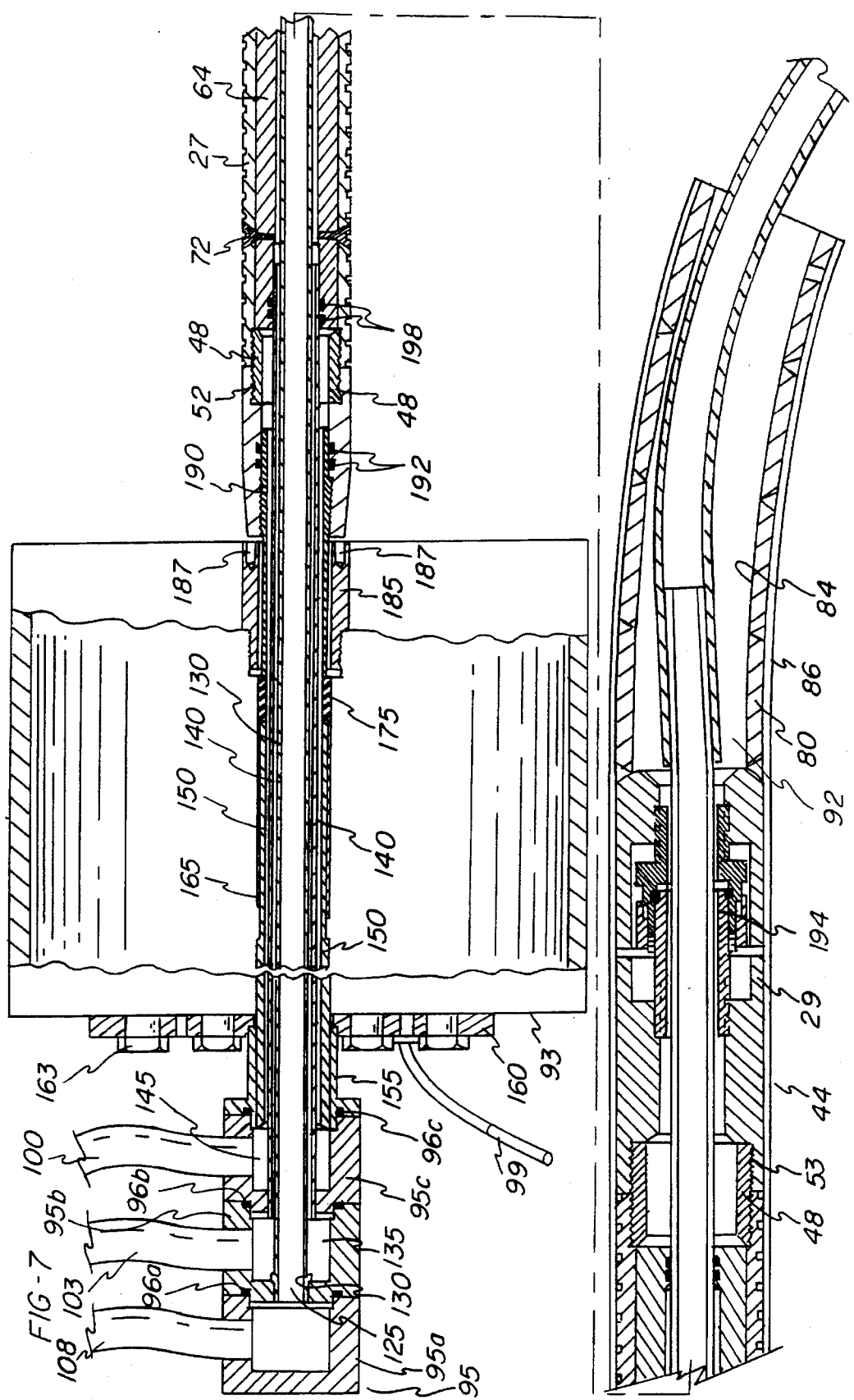

PIPE EXTRUSION DIE HEAD MANIFOLD ASSEMBLY

BACKGROUND OF THE INVENTION

This invention relates generally to a manifold assembly for use with a die head in the extrusion of a plastic, and more particularly to an improved structure capable of forming a pipe wall with apertures therein when the pipe is examined in cross-section.

Plastic pipe has found a variety of uses especially relating to drainage. One of the concerns in the manufacture of plastic pipe is the amount of raw materials consumed and the resultant weight of the finished product. For example, 48" interior diameter solid wall plastic pipe weighs approximately 200 lbs per foot. It has recently been discovered that plastic pipe having apertures formed therein, when the pipe is viewed in cross-section, weighs approximately 30 lbs per linear foot. However, a problem exists in designing a machine capable of manufacturing pipe having the desired cross-section.

In general, extruded plastic pipe is formed on a production line having a variety of specific machines incorporated into the manufacturing process. One of the first machines is an extruder. Plastic powder, or more preferably pellets, is fed through the extruder where it is subjected to high temperatures such that the plastic melts. The plasticized plastic then proceeds through a feed tube, at the end of which the plastic enters into a typically drum shaped die. At the front of the die is the specific cross-section profile to be extruded. As the hot plastic comes out of the die, it passes over what are called calibrating or calibration fingers which assist in maintaining the desired cross-sectional form which has been extruded. These calibration fingers are part of a manifold assembly. The rest of the manifold assembly extends from above the die as well as beyond the calibration fingers. In addition to the extruder and die, which is supported on a die post assembly, plastic pipe is manufactured using a former or forming head.

Prior art manifold assemblies have apparently limited the ability to manufacture a plastic product having a cross-section which incorporates apertures. It is thus apparent that the need exists for an improved manifold assembly which manufactures a product having the desired cross-section.

SUMMARY OF THE INVENTION

The problems associated with prior manifold calibration fingers are overcome in accordance with the present invention by the presence of an improved manifold assembly which can be used in conjunction with a die head in the extrusion of a plastic with the manifold assembly comprising a water inlet tube, a tube through which a vacuum is pulled, a water return tube, a calibration finger first section, and a calibration finger second section.

The calibration finger first section has an outer surface, and: 1) at least one water receiving channel connected to the water inlet tube; 2) a channel connected to the tube through which a vacuum is pulled; and 3) the water return tube positioned centrally of the first section outer surface. The first section also has formed therein apertures connected to the channel connected to the tube through which a vacuum is pulled.

The calibration finger second section also has an outer surface and an interior channel. The second section has the water return tube positioned centrally of the second section outer surface. The second section also has formed therein apertures, with the second section apertures connected to the interior channel.

The first section outer surface has formed therein at least one groove. Preferably the groove is a spiral groove. More preferably there is also formed a first radial groove. Most preferably there is formed a second radial groove. The spiral groove intersects at least one and preferably both of the radial grooves.

The water return tube has a first component and a second component secured to each other. The first component terminates within the second section, and the second component extends beyond the second section. In one embodiment of the invention the second component is curved. Preferably the second component is flexible.

There is also disclosed an improved manifold assembly for use with a die in the extrusion of plastic, said assembly comprising a water inlet tube, a tube through which a vacuum is pulled, a water return tube, a calibration finger first section having formed therein at least one groove, and a calibration finger second section.

The first section outer surface preferably has formed therein a spiral groove and at least two radial grooves, with the spiral groove intersecting at least the two radial grooves. The first section also has formed therein apertures connected to the channel connected to the tube through which a vacuum is pulled. The first section apertures are located in the radial groove.

The water return tube has a first component and a second component secured to each other. The first component terminates within the second section, while the second component extends beyond the second section. Preferably the second component is flexible.

The calibration finger second section has an outer surface and an interior channel. The second section has the water return tube positioned centrally of the second section outer surface. The second section has formed therein apertures connected to the interior channel. The first section apertures have a first diameter and the second section apertures have a second diameter, with the second diameter being greater than the first diameter.

There is also disclosed an improved manifold assembly for use with a die in the extrusion of plastic, the assembly comprising a plurality of tubular assemblies, each tubular assembly comprising a water inlet tube, a tube through which a vacuum is pulled, a water return tube, a calibration finger first section having an outer surface, and a calibration finger second section.

The calibration finger first section has an outer surface, and: 1) at least one water receiving channel connected to the water inlet tube; 2) a channel connected to the tube through which a vacuum is pulled; and 3) the water return tube positioned centrally of the first section outer surface. The first section also has formed therein apertures connected to the channel connected to the tube through which a vacuum is pulled.

The calibration finger second section also has an outer surface and an interior channel. The second section has the water return tube positioned centrally of the second section outer surface. The second section also has formed therein apertures, with the second section apertures connected to the interior channel.

The first section outer surface has formed therein at least one groove. Preferably the groove is a spiral groove. More preferably there is also formed a first radial groove. Most preferably there is formed a second radial groove. The spiral groove intersects at least one and preferably both of the radial grooves.

The water return tube has a first component and a second component secured to each other. The first component terminates within the second section, and the second component extends beyond the second section. In one embodiment of the invention the second component is curved. Preferably the second component is flexible.

It is the primary object of the present invention to provide an improved manifold calibration finger which can manufacture pipe having a plurality of apertures formed therein when the pipe wall is viewed in cross-section.

Other objects and advantages of the invention will be apparent From the following description, the accompanying drawings, and the appended claims.

BRIEF DESCRIPTION OF THE DRAWINGS

FIG. 3 is a side elevational view of the calibration finger first section of the improved manifold assembly of this invention.

FIG. 4 is a side elevational view of the intermediate tube which in the preferred embodiment of the invention is formed and then inserted within the calibration finger first section shown in FIG. 3.

FIG. 6 is a perspective view on a greatly enlarged scale taken from the top of the die of FIG. 1.

FIG. 7 is a vertical cross-sectional view on an enlarged scale taken along line 7—7 of FIG. 2.

DETAILED DESCRIPTION OF THE PREFERRED EMBODIMENT

Figure 1:
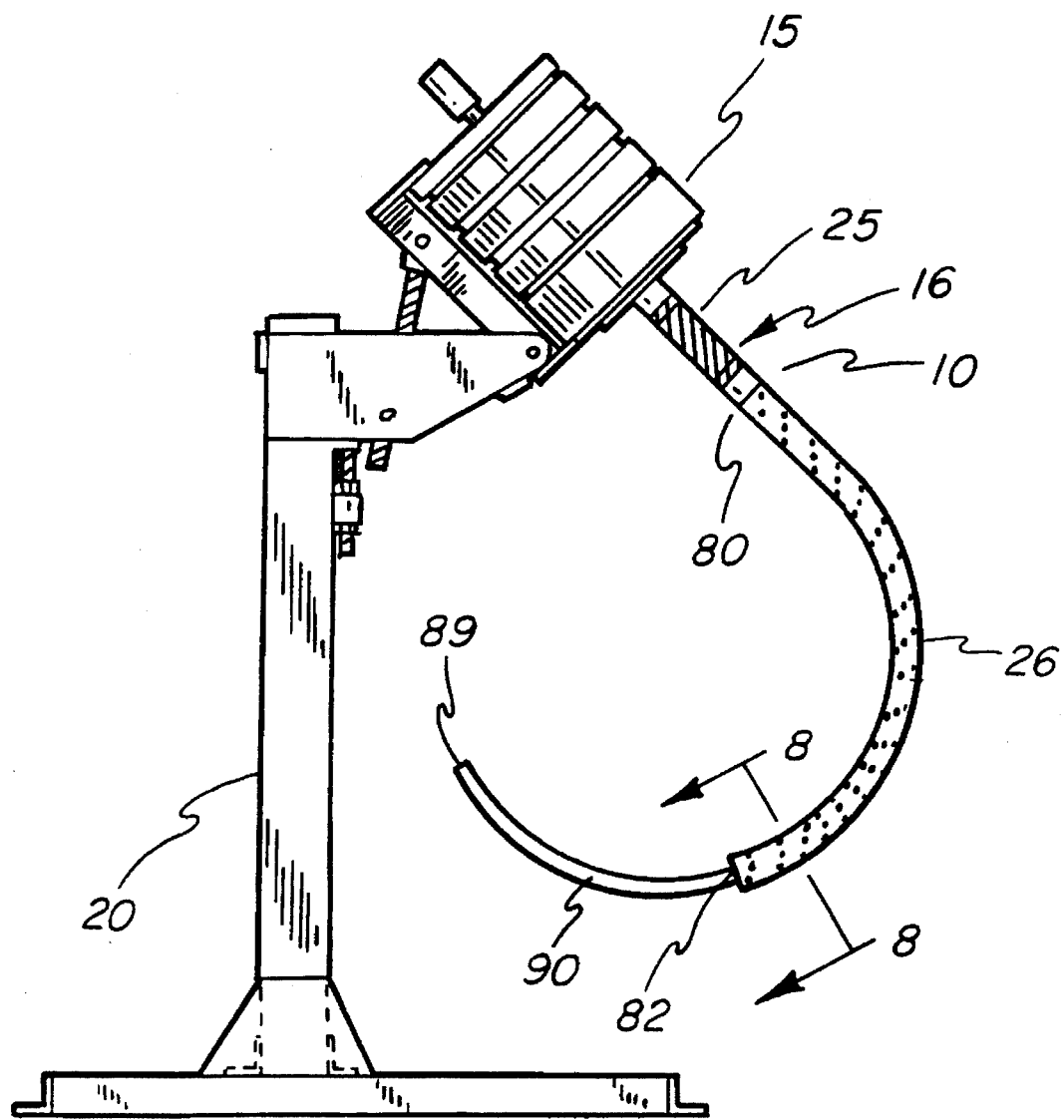
FIG. 1 is a side view of a die and die post assembly with a manifold assembly formed in accordance with the present invention secured thereto in an operative position.

Having reference to the drawings, attention is directed first to FIG. 1 which shows the improved manifold assembly associated with this present invention generally disclosed by the numeral 10. The manifold assembly extends through die 15. Drum shaped die 15 is supported on a die post assembly 20. The die and die post are of the type found in plastic extrusion manufacture. The preferred embodiment of this invention utilizes a side fed spiral feed die, although it could use a side fed spider die. Similarly, the improved manifold calibration fingers 16 are located where calibration fingers of the prior art have been located, namely, at the end of the die where the plastic is extruded therefrom.

Figure 2:
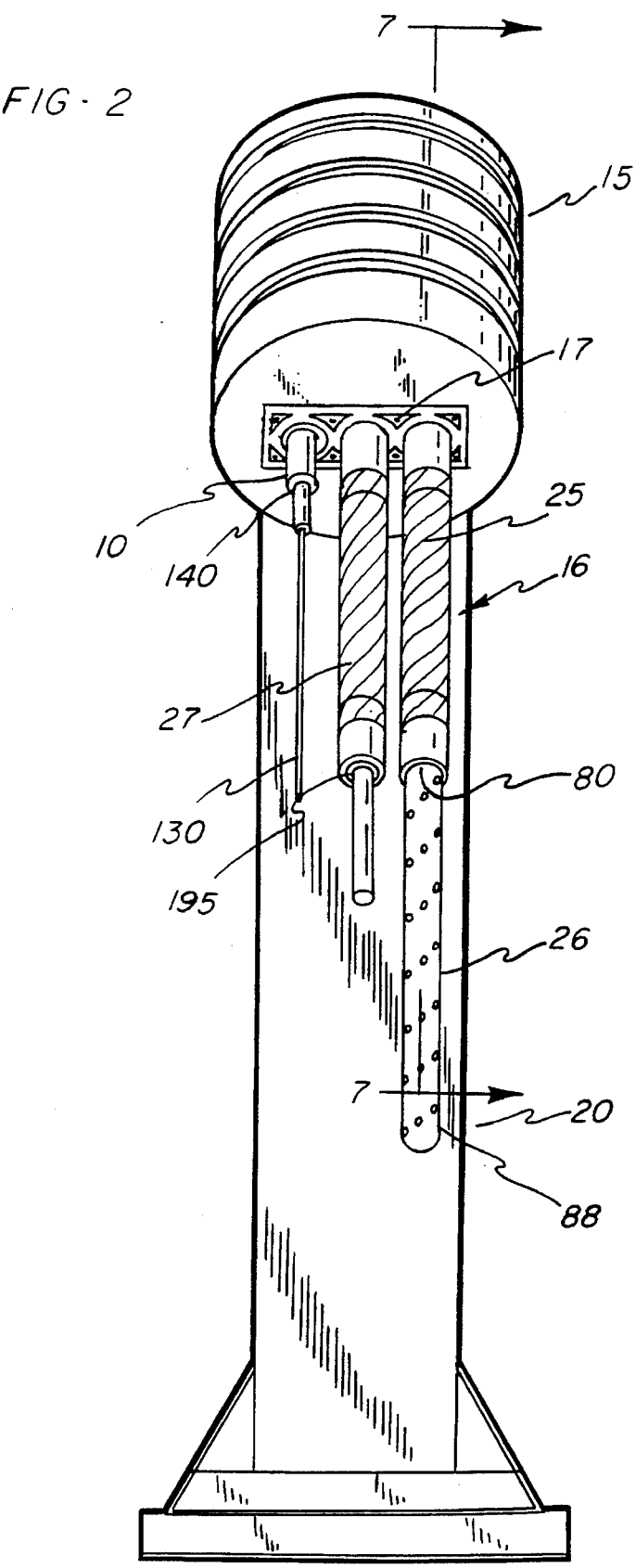
FIG. 2 is a front elevational view of a die and die post assembly in which the die will extrude the wall of a plastic pipe having apertures formed therein, specifically 8 small generally triangular shaped apertures as well as 3 larger generally circular shaped apertures.

This spatial relationship can better be appreciated from consideration of FIG. 2 which discloses the presence of a die head 17. Die heads are well known in the conventional extrusion art. However, this particular die head discloses the presence of 8 small triangular sections and 3 larger circular sections which will permit the extrusion of a pipe wall having a plurality of apertures formed therein. Extending through the die and die head 17 is a portion of the die manifold assembly 10 to which this invention is physically secured. This portion of the die manifold assembly 10 is shown at the left-most side of the die head 17 and extends some distance from the drum-shaped die, as will be discussed below.

At the right-most side of the die head 17 is the calibration finger 16 associated with the manifold 10 of this present invention shown in its complete assembly, as can be appreciated from a comparison with FIG. 1. The calibration finger 16 associated with this invention is formed having a first section 25 and a second section 26. The first section or tubular member 25 is shown secured by itself to the portion of the die manifold assembly 10 which passes through the die 15 at the center portion of the die head 17 in FIG. 2.

The first tubular member 25 is formed in the preferred embodiment of the invention having a tubular outer shell 27. As can be better appreciated from a comparison of FIGS. 2 with FIGS. 3, 5 and 7, the tubular outer shell 27 has a first end as well as a second end, 28 and 29 respectively. Additionally, the outer shell 27 is formed having an outer surface 30 with this outer surface 30 having formed therein a first radial groove 33. Formed in the first radial groove are a plurality of first section apertures 35. Additionally, in the preferred embodiment of the invention a second radial groove 37 is formed having a plurality of second section apertures 39 formed therein.

The tubular outer shell is preferably formed having a first finger end 40, a finger shell 42, and a second finger end 44. These three pieces are components of the tubular outer shell and are secured to each other by respective brass connecting rings 48. Each connecting ring 48 is merely a ring with a threaded outer surface which engages with a portion of the inner surface of the finger shell 42. A threaded portion of the inner surface of first finger end 40 also engages with the connecting ring 48, with that first finger end inner surface being 52. A threaded portion of the inner surface of second finger end 44 also engages with the connecting ring 48, with that second finger end inner surface being 53. It will be appreciated from FIG. 3 that the first finger end is tapered towards the die head. This permits an easier initial flow of the heated plastic over the calibration finger 16 as the plastic exits the die head 17.

In addition to first radial groove 33 and second radial groove 37 the outer surface 30 of tubular outer shell 27 also preferably has formed therein a spiral groove 55. It should also be appreciated that the spiral groove intersects with both the first radial groove and the second radial groove in the preferred embodiment of the invention. It will also be appreciated from a comparison of FIGS. 3 and 5 that the outer shell of the first section 25 of the centralmost set of tubes is preferably formed having two relatively flat surface portions 60 and two curved surface portions 62, whereas the outer two sets of tubes have a flat surface only with respect to their inner side wall as can be seen in FIGS. 5A and 5B respectively.

Figure 5:
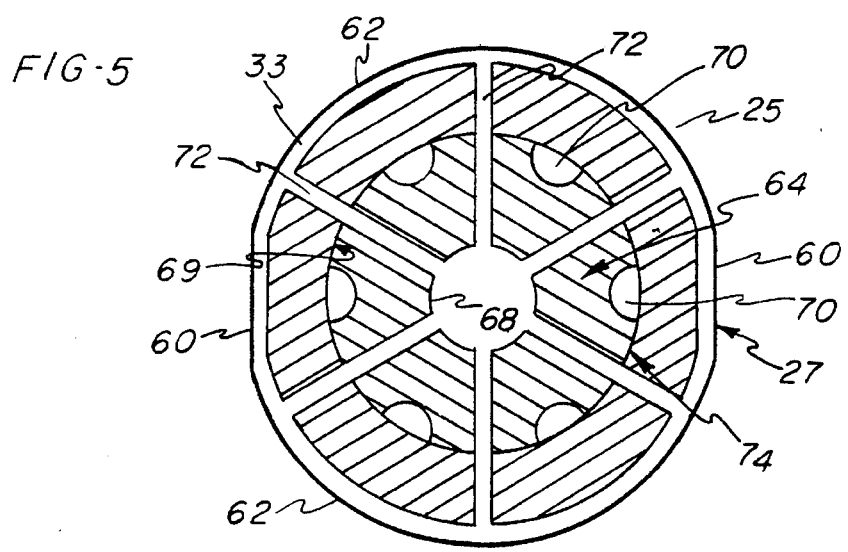
FIG. 5 is a vertical sectional view taken on a greatly enlarged scale along line 5—5 of FIG. 3, however, this particular view shows the calibration finger first section as assembled thereby disclosing both the outer shell as well as the presence of the intermediate tube.
Figure 5A:
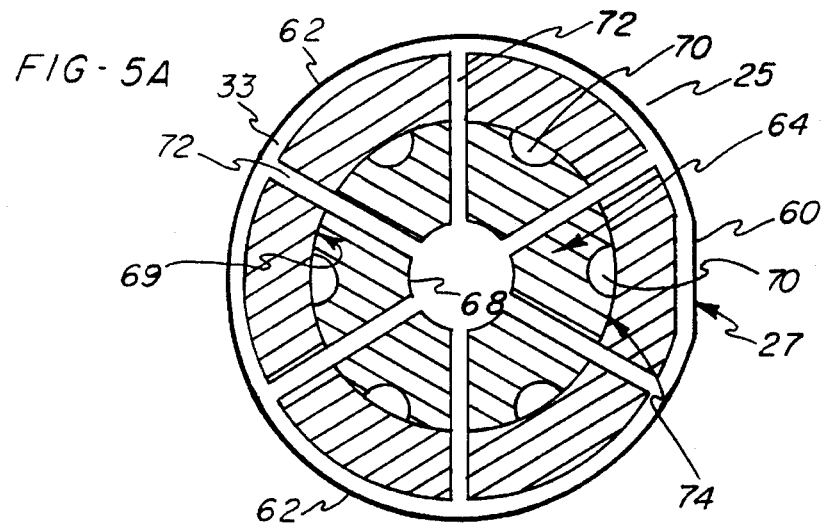
FIG. 5A is a vertical sectional view taken on a greatly enlarged scale and similar to FIG. 5, however, this particular view shows one of the endmost calibration finger first section as assembled.
Figure 5B:
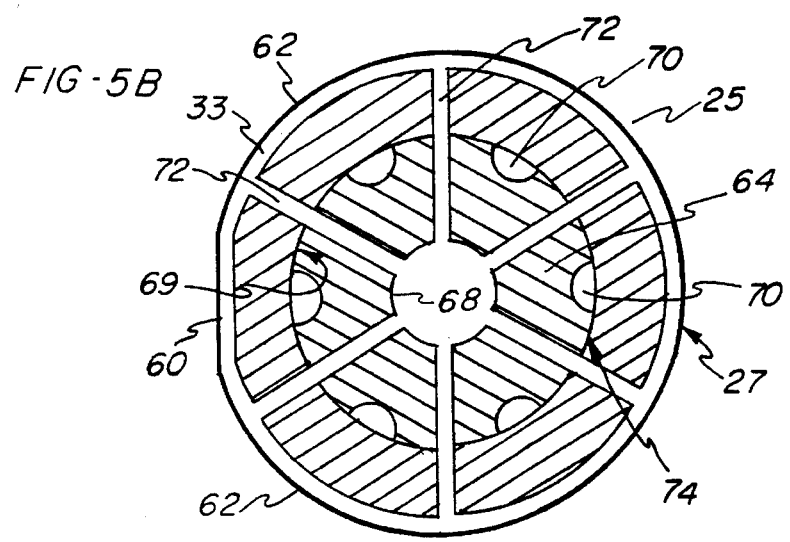
FIG. 5B is a vertical sectional view taken on a greatly enlarged scale and similar to FIGS. 5 and 5A, however, this particular view shows the other endmost calibration finger first section as assembled.
Figure 8:
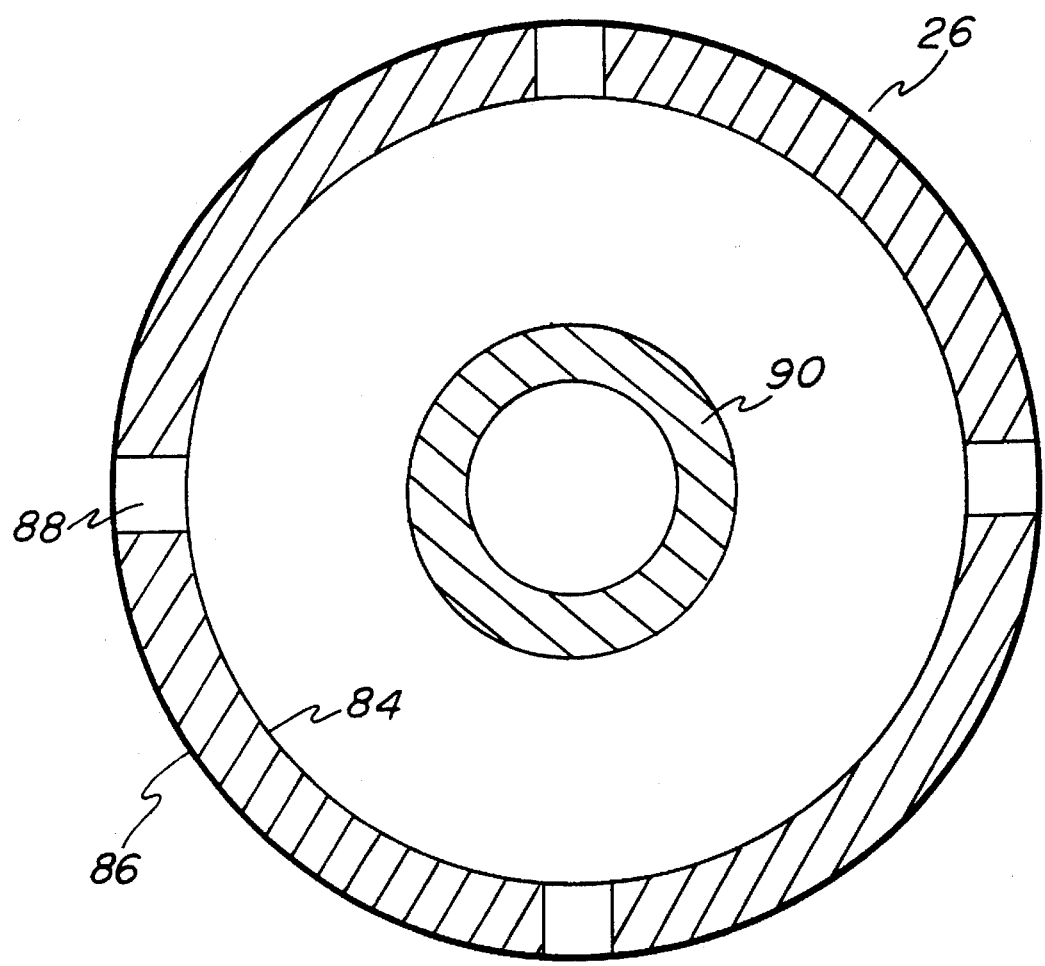
FIG. 8 is a vertical cross-sectional view on a greatly enlarged scale taken along line 8—8 of FIG. 1.

The intermediate tube 64 shown in FIG. 4 also has a first end 65 and a second end 66, and an inner surface 68 as can be appreciated from FIG. 5 as well as the outer surface 69 as can be appreciated from both FIGS. 4 and 5. A plurality of generally longitudinally extending channels 70 are formed in the outer surface 69 of intermediate tube 64. In the preferred embodiment of the invention there are six such water receiving channels 70.

As stated above, FIG. 5 shows a vertical cross-sectional view on a greatly enlarged scale wherein the intermediate tube is positioned so as to be encircled by the tubular outer shell 27. As such, the various water receiving channels 70 may be seen to become enclosed such that they permit the passage of water in a first direction through the die and towards the second section. Additionally, the presence of the cool water in the six channels helps to cool the tubular outer shell in the presence of the hot plastic.

As can also be seen in FIG. 5, the first tubular member 25 also has a plurality of radially extending channels 72 which extend from the inner surface 68 of intermediate tube 64 to the apertures in either radial groove 33 or 37. As will be discussed below, the inner surfaces 74 of the intermediate tube 64 help to define a channel through which a vacuum is pulled.

In actual assembly of the first tubular member, the tubular outer shell has the intermediate tube placed therein then the appropriate holes are drilled through both the tubular outer shell and the intermediate tube. First, the tubular outer shell and intermediate tube are welded with the inner surface of the outer shell 27 being welded to the outer surface 69. Once the two components are stabilized and a 3/32" diameter hole is drilled, a 3/32" outer diameter aluminum tube with a 1/16" hole is press fit into the 3/32" hole until it reaches the inner surface 68. This process is repeated until the desired number of channels exist, which in the preferred embodiment shown in FIG. 5 is six. The tops of the tubes can be filed off and each respective radially extending channel 72 sealed in place with an appropriate sealant. Preferably the radial groove is placed on the outer shell after the aforementioned welding and drilling have occurred, but before the insertion of the tubes which make the radially extending channel 72.

The finger shell 42 is approximately 18" long in the preferred embodiment of the invention and has an outer diameter of approximately 2 ½". Preferably the center of the first radial groove is 2 ½" from the junction of the finger first end and finger shell. Meanwhile, the second radial groove is approximately 1 9/16" from the junction of the second finger end and finger shell. The spiral groove is 3/32" wide and has a 1" pitch double lead over the entire 18". Similarly, the radial grooves are 3/32". Furthermore, the various longitudinally extending channels 70 are formed having a radius of 5/16". Further, each of the slots are formed being ¼" from the high point of the radius. The intermediate tube is approximately 16 ½" long and has an outer diameter such that it fits the inner diameter of the outer shell. Preferably both the outer shell and the intermediate tube are fabricated from aluminum.

As can be appreciated from a comparison of FIGS. 1, 2, 7 and 8 the second tubular member 26, also preferably fabricated from aluminum, comprises a first end 80 and a second end 82 as well as an inner surface 84 and an outer surface 86. The longitudinal shape of the second tubular member 26 corresponds to the shape of the plastic product to be produced. Where as here the fabrication system is designed to produce circular plastic pipe, the longitudinal shape of the second section 26 is curved. As can be appreciated in the drawings, the second tubular member 26 also has a plurality of apertures 88 formed therein with these apertures extending between the inner surface 84 and the outer surface 86 of the second tubular member 26. Thus it can be appreciated that the second end of the tubular outer shell 27 of the first tubular member 25 is attached to the curved member first end 80.

It should also be appreciated that the first tubular member is of a first length and the second tubular member is of a second length with this second length being longer than the first length. For example, in the embodiment of the invention discussed herein, the second tubular member measures 42" in length, with the first 3" being straight. Specifically it should also be appreciated that the diameter of the curved member apertures are greater than the diameter of the first member apertures, primarily because the curved member apertures facilitate the flow of water therethrough while the first member apertures are used to facilitate the pulling of a vacuum. The vacuum assists in stabilizing the shape of the plastic as it is extruded.

The portion of the die manifold assembly 10 secured to die 15 can best be appreciated from a comparison of FIGS. 6 and 7. As can be appreciated from those drawing figures, the die head rear face 93 has secured thereto a rear manifold tube housing 95, with this securing preferably accomplished by four screws. In actual fabrication this rear manifold tube housing comprises three components 95a, 95b, and 95c respectively. It will also be appreciated that manifold tube housing O-rings 96a, 96b, and 96c are positioned adjacent the corresponding rear manifold tube housing component.

A TEFLON® insulative tube 98 connects the interior of the die at the die head rear face 93 with a low pressure air inlet line 99. Still further, a water inlet line, with one tube for each manifold calibration finger is secured to the rear manifold tube housing. This water inlet line 100 permits cool water to be introduced into the manifold assembly.

A rear vacuum pipe 103 extends from the rear manifold tube housing 95 and connects to a rear vacuum line 105. Once again it will be appreciated that the number of rear vacuum pipes 103 and hence the number of rear vacuum lines 105 correspond to the number of calibration fingers 16. A water expulsion pipe 108 also extends from the rear manifold tube housing 95 with each water expulsion pipe 108 being connected to the water expulsion outlet line first section 110. While the rear vacuum pipe and water expulsion pipe are preferably formed of metal, the rear vacuum line as well as the water expulsion outlet line first section are of plastic composition. Each of the water expulsion outlet line first sections 110 connect to a water ejector 112. It has been found that a well ejector package sold by Teel Water Systems as a heavy duty shallow well ejector works quite well to facilitate the removal of water through the manifold following its circulation therethrough. The various water ejectors 112 are secured to a water ejector mounting plate 113 which is part of the die post assembly 20. To facilitate the operation of the water ejector 112 a respective water expulsion inlet lines 115 are secured at the water ejector mounting plate to be secured to the water ejector 112. Similarly, a respective water expulsion outlet line second sections 120 are secured at the water ejector mounting plate to the water ejector. In actual operation, the flow of water through the water expulsion inlet lines 115 into the water ejectors 112 creates a venturi effect which results in the formation of a vacuum which in turn draws the water through the respective water expulsion line first sections and thereafter forceably expels water through the water expulsion outlet line second section 120.

Yet a better appreciation of the inner workings of this improved die manifold assembly 10 can be appreciated from consideration of FIG. 7 which shows a water expulsion port 125 through which the water passes as it is drawn through the calibration finger and secured manifold assembly and then flows through the water expulsion outlet line first sections. The water enters the water expulsion port 125 from the inner manifold tube 130 which is connected to the proximal end 92 of the second component 90.

It will also be appreciated that within rear manifold tube housing component 95b is a vacuum port 135. The distal end of the vacuum tube 140 is held in frictional engagement by the inner surface 68 of the intermediate tube 64 of first section 25. When the second component 90 is frictionally secured to the distal end of the inner manifold tube 130, the rear vacuum line and rear vacuum pipe 103 permit a vacuum to draw inwardly through the apertures in the radial grooves.

Also shown is a water inlet port 145 through which the water enters the rear manifold tube housing 95c through water inlet line 100. The water thus flows through respective outer manifold tubes 150. Each of inner manifold tube 130, vacuum tube 140 and outer manifold tube 150 is preferably fabricated from stainless steel. A housing connector 155 secures the rear manifold tube housing to a manifold mounting plate 160 which in turn is secured to the die head rear face 93 by appropriate fasteners 163.

Thus, as die manifold tube 165 extends through the die itself, it has therein the outer manifold tube 150 through which cool water is flowing in a first direction, vacuum tube 140 through which a vacuum is being pulled in the opposite direction to the flow of the cool water, and inner manifold tube 130 through which warm water is also being pulled in that second direction thereafter exiting through the water expulsion lines. Within die manifold tube 165 is a preferably hex shaped structure 175 which is placed so as to aid in the support and stabilization of the outer manifold tube 150. It also minimizes the transfer of heat between the cooler tubes and the warmer ones. This hex shaped structure 175 can be appreciated as being positioned adjacent mandrel extension tube 185 of the die, which mandrel extension tube is secured at the 10 front face of the die head at die head apertures 187, which are preferably spanner wrench holes. Mandrel extension tube is screw threaded into a mandrel extension component of the die, with the mandrel extension of the type known in the art.

In actual assembly, the die is assembled so as to encompass the portion of the manifold assembly shown and discussed above with respect to FIG. 7. When finished it resembles the left-most portion of the die head as seen in FIG. 2. The first section 25 is then slid over the secured die manifold assembly 10. The first finger threads 190 are then secured to the threaded terminal corresponding terminal end of the outer die manifold tube. Helping to maintain a good seal are a first pair of O-rings 192 placed within appropriate grooves on the first finger end inner surface 52 as shown in FIG. 7. The first tubular member then is positioned as shown in the middle of die head 17. The second tubular member at its first end 80 has a quick release female mechanism 194 of the type well known in pipe art. In the preferred embodiment of the machine associated with the process of this invention this quick release mechanism is a 1" brass, straight through flow valve manufactured by Parker-Hanifin, which mechanism joins with the quick release male mechanism 195 positioned at the second end 66 of the intermediate tube 64. Thus, when used in combination to form three circular apertures through a pipe wall when viewed in cross-section, the flat sections 60 on each of the calibration fingers are parallel to a flat section on an adjacent calibration finger. A second pair of O-rings 198 are found in appropriate grooves on the inner surface 68.

In actual use, cooling water passes through the water inlet tube 150 and the water receiving channels 70 within each manifold calibration finger while a vacuum is pulled through the middle manifold tube 140 and through the radially extending channels 72 in the first section. The rear manifold tube housing component 95b is preferably welded to vacuum tube 140. Similarly, rear manifold tube housing 95c is preferably welded to outer manifold tube 150. Meanwhile rear manifold tube housing component 95a is preferably screwed onto inner manifold tube. Preferably the flow rate is 4–5 gallons of water per minute per each set of tubes. Still further, water flows from the water receiving channels into the second section 26 and thereafter through the apertures 88 in the second tubular member onto the outer surface 86 of such calibration finger. The water thus flows between the outer surface of the second section and the extruded plastic which surrounds the calibration finger when the plastic is being extruded. The water is deposited within the cavity of the extruded plastic.

Eventually the water level within the cavity reaches the distal tip 89 of the flexible tube 90 where it is sucked back through the interior of this second component 90, through the second component's juncture with the first component 130 preferably within the second section 26, through the water return tube or first component 130 encircled by the die, and finally through the respective tube connecting the water return tube outlet with the water ejector 112.

It will be readily apparent from the foregoing detailed description of the illustrative embodiment of the invention that a particularly novel and extremely unique improved manifold assembly is provided. While the form of apparatus described herein constitutes the preferred embodiment of the invention, it is to be understood that the invention is not limited to this precise form of apparatus and that changes may be made therein without departing from the scope of the invention which is defined in the depended claims.

What is claimed is:

1. An improved manifold assembly for use with a die in the extrusion of plastic, said assembly comprising a water inlet tube, a tube through which a vacuum is pulled, a water return tube, a calibration finger first section having an outer surface, said first section having: 1) at least one water receiving channel connected to said water inlet tube; 2) a channel connected to said tube through which a vacuum is pulled; and 3) said water return tube positioned centrally of said first section outer surface, said first section having formed therein apertures connected to said channel connected to said tube through which a vacuum is pulled, and a calibration finger second section having an outer surface and an interior channel, said second section having said water return tube positioned centrally of said second section outer surface, and said second section having formed therein apertures connected to said interior channel.

2. The manifold assembly according to claim 1 wherein said first section outer surface has formed therein at least one groove.

3. The manifold assembly according to claim 2 wherein one groove is a spiral groove.

4. The manifold assembly according to claim 2 wherein at least one groove is a radial groove.

5. The manifold assembly according to claim 4 wherein one groove is also a spiral groove, said spiral groove intersecting with at least one radial groove.

6. The manifold assembly according to claim 1 wherein said water return tube has a first component and a second component secured to each other, said first component terminating within said second section, and said second component extending beyond said second section.

7. The manifold assembly according to claim 6 wherein said second component is curved.

8. The manifold assembly according to claim 6 wherein said second component is flexible.

9. An improved manifold assembly for use with a die in the extrusion of plastic, said assembly comprising a water inlet tube, a tube through which a vacuum is pulled, a water return tube, a calibration finger first section having an outer surface, said first section having: 1) at least one water receiving channel connected to said water inlet tube; 2) a channel connected to said tube through which a vacuum is pulled; and 3) said water return tube positioned centrally of said first section outer surface, said first section outer surface having formed therein a spiral groove and at least two radial grooves, said spiral groove intersecting at least said two radial grooves, said first section having formed therein apertures connected to said channel connected to said tube through which a vacuum is pulled, said first section apertures located in said radial groove, said water return tube having a first component and a second component secured to each other, said first component terminating within said first section, and said second component extending beyond said first section, said second component being flexible, and a calibration finger second section having an outer surface and an interior channel, said second section having said water return tube positioned centrally of said second section outer surface, and said second section having formed therein apertures connected to said interior channel, said first section apertures having a first diameter and said second section apertures having a second diameter, said second diameter being greater than said first diameter.

10. An improved manifold assembly for use with a die in the extrusion of plastic, said assembly comprising a plurality of tubular assemblies, each of said tubular assemblies comprising a water inlet tube, a tube through which a vacuum is pulled, a water return tube, a calibration finger first section having an outer surface, said first section having: 1) at least one water receiving channel connected to said water inlet tube; 2) a channel connected to said tube through which a vacuum is pulled; and 3) said water return tube positioned centrally of said first section outer surface, said first section having formed therein apertures connected to said channel connected to said tube through which a vacuum is pulled, and a calibration finger second section having an outer surface and an interior channel, said second section having said water return tube positioned centrally of said second section outer surface, and said second section having formed therein apertures connected to said interior channel.

11. The manifold assembly according to claim 10 wherein said first section outer surface has formed therein at least one groove.

12. The manifold assembly according to claim 11 wherein one groove is a spiral groove.

13. The manifold assembly according to claim 11 wherein at least one groove is a radial groove.

14. The manifold assembly according to claim 13 wherein one groove is also a spiral groove, said spiral groove intersecting with at least one radial groove.

15. The manifold assembly according to claim 10 wherein said water return tube has a first component and a second component secured to each other, said first component terminating within said second section, and said second component extending beyond said second section.

16. The manifold assembly according to claim 15 wherein said second component is curved.

17. The manifold assembly according to claim 15 wherein said second component is flexible.

* * * * *

UNITED STATES PATENT AND TRADEMARK OFFICE
CERTIFICATE OF CORRECTION

PATENT NO. : 5,513,975
DATED : May 7, 1996
INVENTOR(S) : Wise et al.

It is certified that error appears in the above-identified patent and that said Letters Patent is hereby corrected as shown below:

On the title page, should read:

Inventors: John Wise; Larry L. Martin, both of Hamilton, Ohio; and Dimitris Tsigopoulos of Athens, Greece Signed and Sealed this Twenty-fourth Day of September, 1996

*Attest:*

BRUCE LEHMAN

*Attesting Officer*  *Commissioner of Patents and Trademarks*